No. 737,212. PATENTED AUG. 25, 1903.
C. A. DEYERLE.
COMPUTING SCALE.
APPLICATION FILED NOV. 4, 1902.
NO MODEL. 5 SHEETS—SHEET 3.

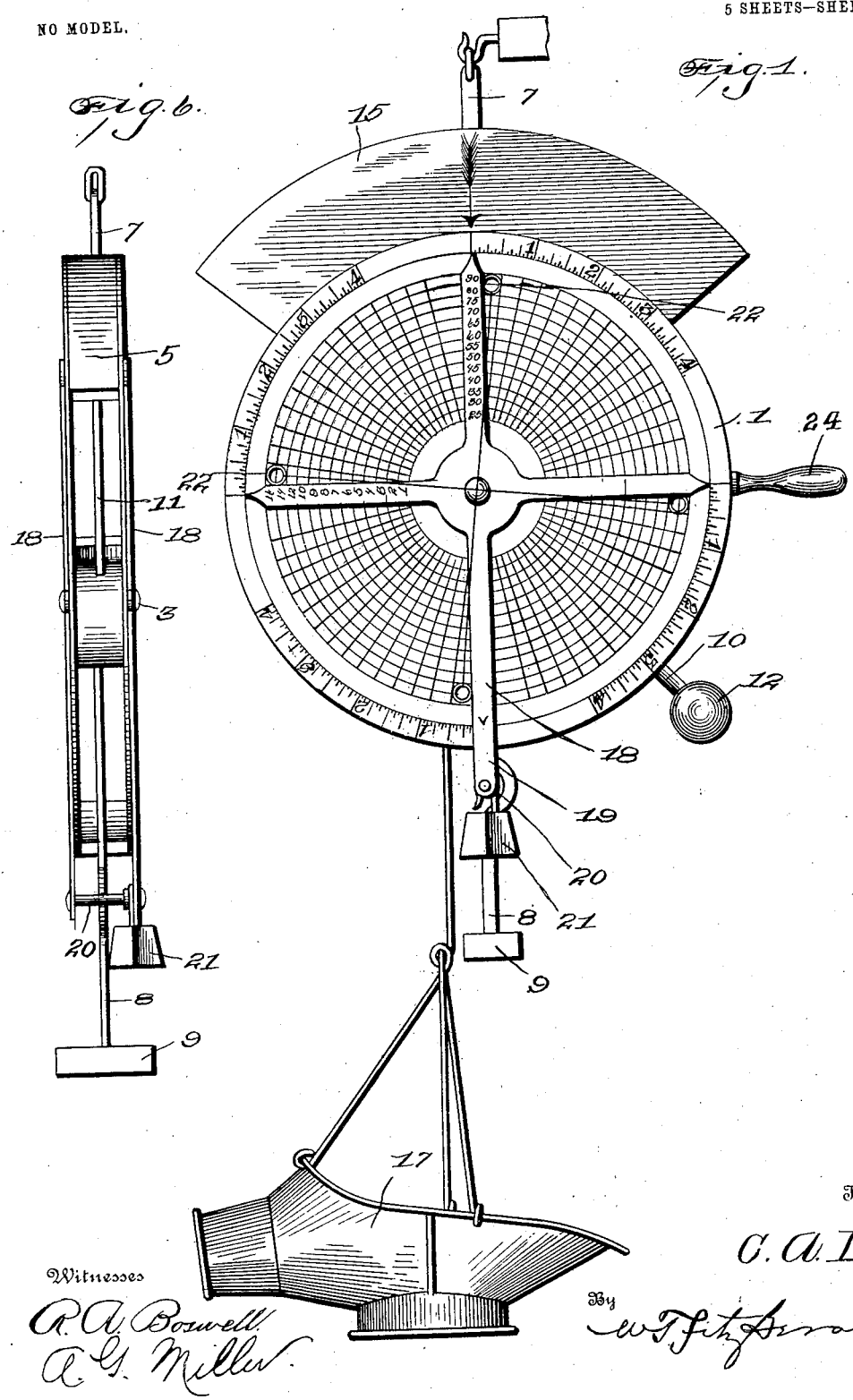

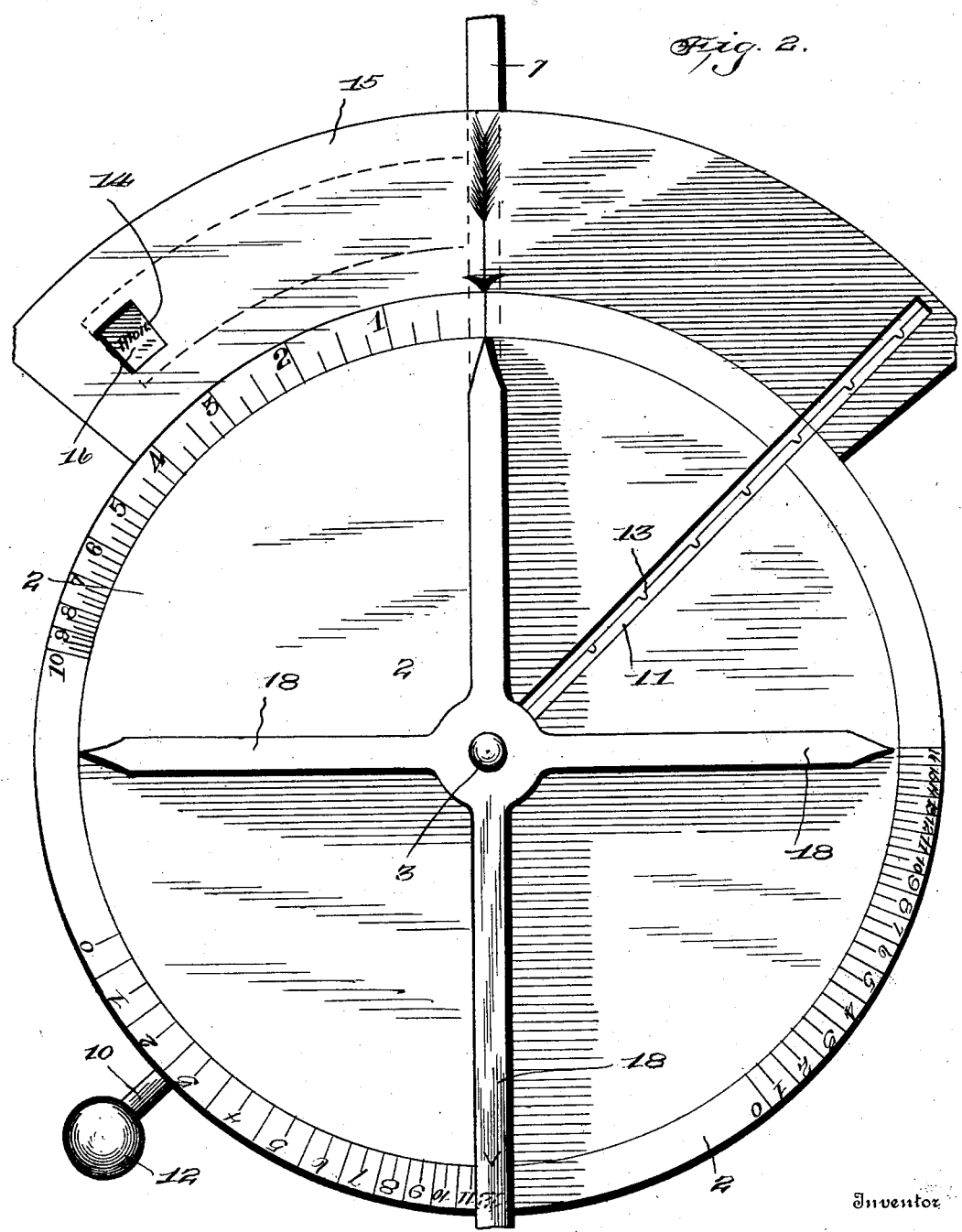

Witnesses
R. A. Boswell
A. G. Miller

Inventor
C. A. Deyerle.
By W. J. Fitzgerald
Attorneys

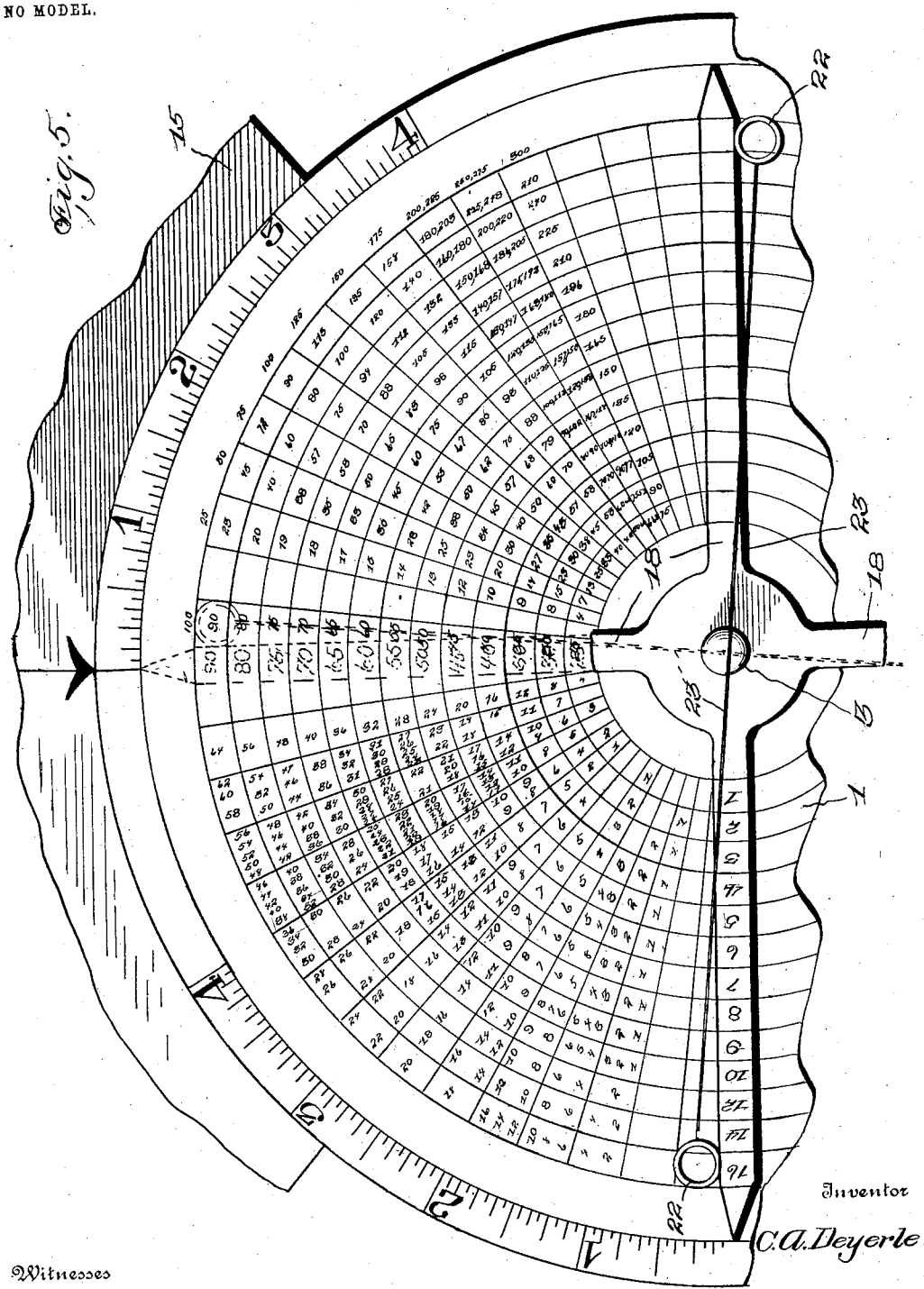

No. 737,212. PATENTED AUG. 25, 1903.
C. A. DEYERLE.
COMPUTING SCALE.
APPLICATION FILED NOV. 4, 1902.
NO MODEL. 5 SHEETS—SHEET 5.

Witnesses
R. A. Boswell.
A. G. Miller.

C. A. Deyerle,
Inventor

By W. T. Fitzgerald
Attorneys

No. 737,212. Patented August 25, 1903.

UNITED STATES PATENT OFFICE.

CHARLES A. DEYERLE, OF ELLISTON, VIRGINIA.

COMPUTING-SCALE.

SPECIFICATION forming part of Letters Patent No. 737,212, dated August 25, 1903.

Application filed November 4, 1902. Serial No. 130,059. (No model.)

*To all whom it may concern:*

Be it known that I, CHARLES A. DEYERLE, a citizen of the United States, residing at Elliston, in the county of Montgomery and State of Virginia, have invented certain new and useful Improvements in Computing-Scales; and I do hereby declare the following to be a full, clear, and exact description of the invention, such as will enable others skilled in the art to which it appertains to make and use the same.

My invention relates to computing-scales of that class adapted to be operated by gravity.

My object is to provide a scale that is accurate in weighing and computing the different prices of the article being weighed and at the same time being a scale that can be cheaply manufactured and one that may be suspended from the ceiling, bracket, tripod, or the like.

Other objects and advantages will be made clearly apparent from the following specification considered in connection with the accompanying drawings, which are made a part of this application, and in which—

Figure 5:
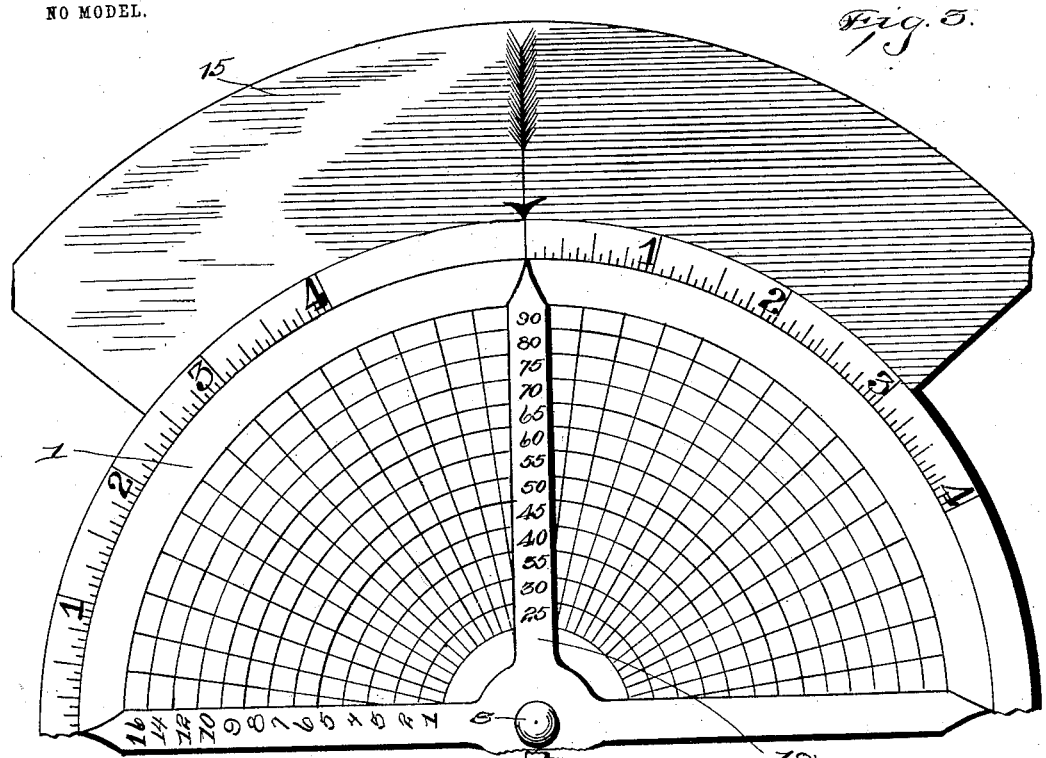
Figure 4:
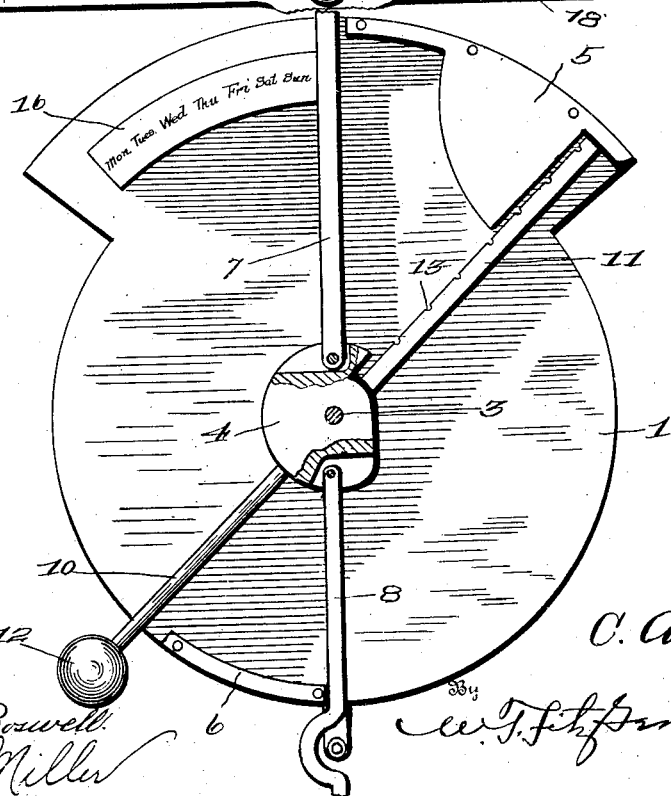
Figure 7:
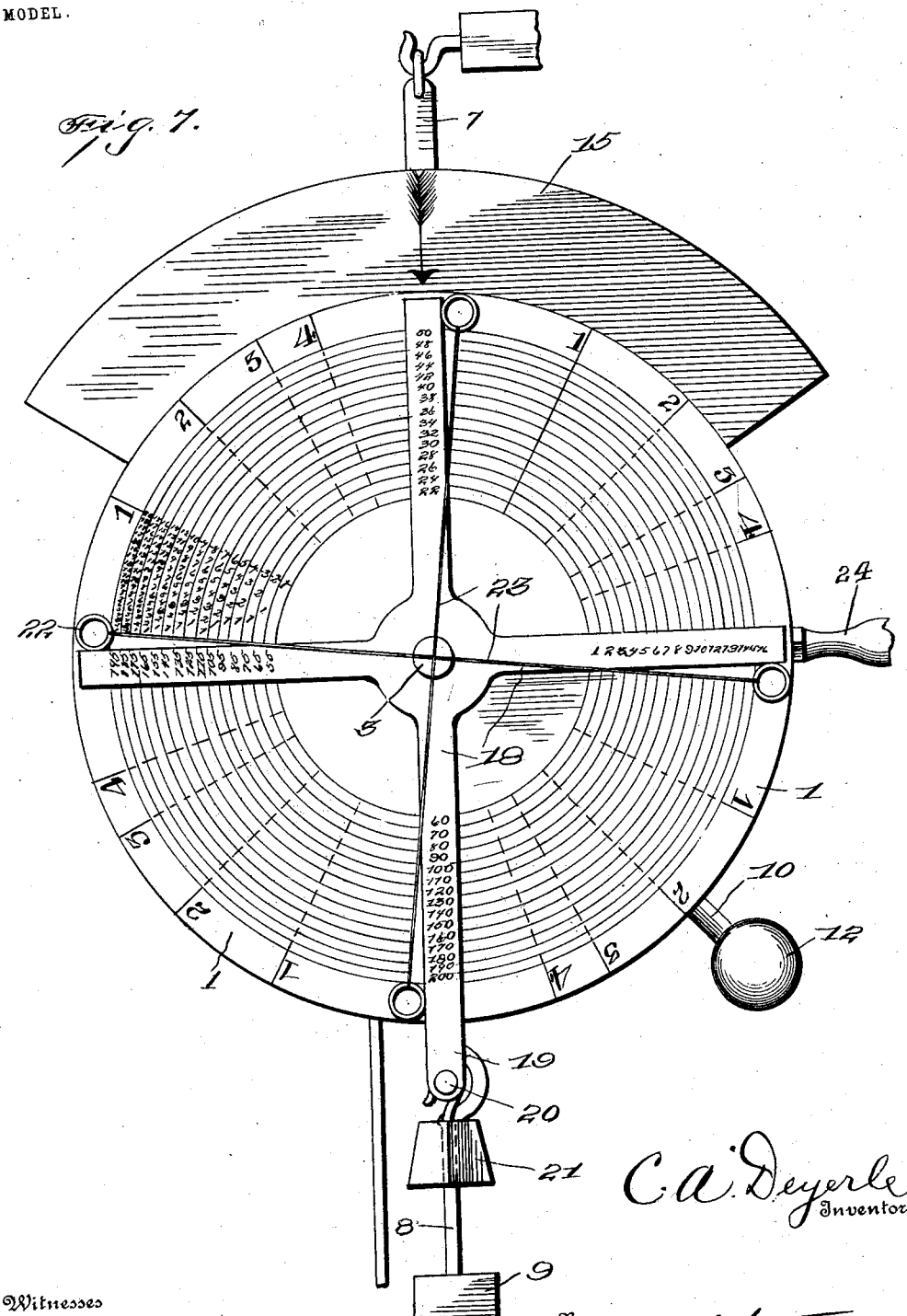

Figure 1 is a front elevation of my improved scale in its operative position. Fig. 2 is a detail plan view of the opposite side of the scale, as shown in Fig. 1. Fig. 3 is a detail view, upon an enlarged scale, from that shown in Fig. 1. Fig. 4 is a central vertical sectional view with portions of the weighing mechanism broken away. Fig. 5 is an enlarged detail front elevation showing one series of calculations thereon. Fig. 6 is an edge elevation thereof; and Fig. 7 is a front elevation of the scale, showing a different form of computation from that shown in Fig. 5.

Similar reference-numerals indicate similar parts throughout the drawings, in which 1 and 2 designate disks, which are preferably made circular in form and are adapted to be carried upon the spindle or shaft 3. Said disks 1 and 2 are made rigid with respect to each other through the medium of the hub 4 and the web-sections 5 and 6. Pivotally connected to the upper side of the hub 4 is an arm 7, the said arm being designed to support the scales in their operative position. An additional bar 8 is also pivotally secured to the lower side of said hub 4, said bar being designed to carry weights 9.

Rigidly secured to the hub 4 is an arm 10, one end of which serves as a scoop-beam 11, the opposite end terminating in a counter-balance-weight 12. The said scoop-beam 11 is provided with enlarged notches 13, corresponding in number to the number of days in the week, so that by moving the scoop from one notch to another the disks 1 and 2 are caused to revolve sufficiently to bring the name of the day of the week into registration with a window 14 in the upwardly-extending portion 15 of the plate 2.

The names of the days of the week are placed upon a plate 16, said plate being rigidly secured to the bar 7, so that said plate stands stationary. Thereby when the scoop 17 is moved outwardly one notch the disks 1 and 2 are revolved sufficiently to bring the name of the next day of the week in front of the window, it being understood that the first notch nearest the hub designates "Monday," the second "Tuesday, and so on." From the fact that the disks 1 and 2 only make one-quarter of a revolution it will be seen that the said disks may have four different tables of weights placed thereon, giving a scale of pounds and their fractions, such as avoirdupois, apothecary, troy, &c.

It will be seen that by increasing the diameter of the disks 1 and 2 the weighing capacity of the scales will be increased accordingly. Mounted upon the shaft 3 at either end thereof are indicators 18, so arranged that they will register with the different graduations upon the disks 1 and 2. One portion of the indicator-bars is elongated, as at 19, so as to extend beyond the periphery of the said disks 1 and 2, and are rigidly secured together by means of the cross-bar or shaft 20. In order to hold the said indicator-bars 18 in a vertical position at all times, a weight 21 is suspended upon the shaft 20, the said weight being of sufficient size to overcome any friction upon the shaft 3 caused by the rotation of the hub 4.

In Fig. 2 of the drawings I have shown my preferred form of placing the graduations upon the disks 1 and 2, the upper left-hand quarter of the disks being graduated to weigh heavy articles, the lower left-hand quarter for computing the weight and price of the article, and the lower right-hand quarter being graduated to weigh lighter articles. While I have not shown any graduations upon the upper right-hand section of the disks, it will be understood that any preferred number of graduations may be placed thereon.

When it is desired to weigh heavy articles, the scoop 17 is placed near the center of the disks and preferably engaging the notch 13, which will bring the word "Monday" before the window 14. When it is desired to weigh a small quantity of merchandise, the scoop 17 is placed near the outer end of the scale-beam 11, and preferably engages the notch that would bring the word "Saturday" before the window 14. As the scoop is moved outwardly upon the beam 11 it necessarily rotates the disks 1 and 2 and moves the zero-point away from the arms 18, and to rectify this I have placed the zero-point upon the lower right-hand section of the disks the same distance from the lower vertical indicator-arm 18 as the distance between the words "Monday" and "Saturday" upon the plate 16, so that when the scoop 17 is placed in the notch indicating "Saturday" the said lower arm 18 will register with the zero-mark upon this section of the disks. By placing the scoop at or near the outer end of the beam 11 a much more sensitive brake is attained than when the scoop is at or near the inner end of the beam, thus better adapting the scale for weighing ounces and fractions thereof, and the inner end, where the brake is more dense, for weighing pounds.

When the scale is used as a computing-scale, it is desirable to have a uniform brake for the ounces and pounds, and to this end I place the scoop at or near the center of the beam 11, preferably engaging the notch that would show "Wednesday" before the window 14. As this would also move the zero-point away from the arm 18, a new zero-point is provided, the distance between the new zero-point and the arm 18, designed to register therewith, being the same as the distance between "Monday" and "Wednesday" upon the plate 16, as shown on the lower left-hand section of the disk 2 of Fig. 2, the computing-table being shown in other views of the drawings. Therefore when the scoop is in engagement with a particular notch upon the beam 11 to show the day of the week—for example, "Thursday"—and it is desired to weigh something that will weigh more than a pound, the scoop is moved to the proper notch for weighing heavy substances. After the article is weighed the scoop is again placed in the proper notch to bring the required day before the window 14, the operator observing, of course, what day is showing before he moves the scoop, so that he will make no mistake in the day when he moves the scoop from the weighing-notch back to the day-notch.

Soldered or otherwise secured to the indicator-arms 18 are the rings 22, to which are attached a very fine wire, string, or the like 23, so that when the said wire is secured to one ring and carried across to the ring on the indicator-point directly opposite the wire will pass centrally over the pivot-point 3, as clearly shown in Figs. 1, 5, and 7. The object of this device is that when the disks 1 and 2 are caused to revolve the cost of the article being weighed will come directly beneath the said wire 23, so that by a very casual glance one can tell the exact weight and cost of the article being weighed. The indicator-arms 18 are provided with figures denoting the price per pound or per hundred pounds, as the case may be, of the different articles to be weighed and are placed upon the said indicator-bars in such position that they register with the tables, giving the price per fractional pound of the different articles.

Referring to Fig. 7 of the drawings, wherein a portion of one of the graduated tables is set forth, we will assume that the cost of the article being weighed is $1.95 per hundred pounds and that the purchaser desires only fifteen cents' worth of the said article. To give the customer the exact weight of fifteen cents' worth a sufficient quantity is placed in the scoop 17 to revolve the disk until the number "15" in the column registering with the price per hundred pounds (in this instance $1.95) comes directly beneath the wire 23, the same rule applying to all the other graduations placed upon said disk. When the capacity of the scales as indicated by the graduations placed upon the disks is not great enough, weights are placed upon the beam 8, a two-pound weight drawing ten pounds as per graduations on face of the disks, and by multiplying the cost price by two the exact cost will be given. By having the graduations upon the disks 1 and 2 exactly alike the customer will be able to see that he is getting the exact weight without the necessity of having to turn the scales around.

A handle 24 is secured to the disks 1 and 2 at any desired point, so that when it is desired to turn either side of the scale to the light the operator grasps the handle and performs the operation, thus keeping the disks free of any finger-marks. It also provides a means for the operator to study the scales while moving the scoop from one notch to another.

It will readily be understood that the change of weather will have no effect upon the operation of my device and neither will it be disturbed by the settling or sagging of the ceiling or whatever it may be suspended from.

It will be understood that my invention may be modified in various ways, and I therefore desire to comprehend all substitutes and equivalents that may be adopted without departing from the spirit and scope of my invention.

Believing that the advantages and manner of using my improved scale have been made fully apparent from the foregoing specification considered in connection with the accompanying drawings, further description is deemed unnecessary.

Having thus fully described my invention, what I claim as new, and desire to secure by Letters Patent, is—

1. The herein-described automatic computing and weighing scale comprising a suitable supporting-frame; a pair of disks rotatably carried upon said frame and provided upon their surface with suitable graduations; a fixed plate interposed between said disks and adapted to be viewed through a window in one of said disks, in combination with a graduated arm having a counterbalanced lower end and provided with a plurality of corrugations or notches, and a hooked rod adapted to engage any preferred one of said corrugations and having at its lower end a scoop 17 whereby the scoop will operate to move the disk over the graduated plate and permit the day of the week to be read through the window therein all operatively combined substantially as specified and for the purpose set forth.

2. The herein-described automatic computing and weighing scale comprising a suitable supporting-frame; a pair of disks rotatably carried upon said frame, and provided upon their surfaces with suitable graduations, in combination with indicator-arms secured to a supporting-axis carried by said frame, said arms being grouped in pairs and coming to a common center, each arm being provided with a wire-retainer, and a wire stretched from one retainer to the other, whereby said wire will obliquely intersect said arms, substantially as set forth.

3. The herein-described automatic computing and weighing scale comprising a suitable supporting-frame; a pair of disks rotatably carried upon said frame provided upon their outer surfaces with suitable graduations, in combination with two pairs of indicator-arms preferably integrally formed and disposed at right angles to each other, each pair having wire-engaging means and wires adapted to be disposed obliquely across the face of each pair of arms whereby the wires of each pair of arms will cross each other at the pivot-point of the arms and thereby be disposed at right angles to each other substantially as specified and for the purpose set forth.

4. In an automatic computing and weighing scale, two pairs of indicator-arms preferably integrally formed, said pairs being disposed at right angles to each other and mounted on a common pivot-point, each pair being provided with wire-retaining means and a wire attached thereto, whereby the wire will cross the said arms at an oblique angle, substantially as set forth.

5. In an automatic computing and weighing scale, two pairs of indicator-arms preferably integrally formed, said pairs being disposed at right angles to each other and mounted on a common pivot-point, each pair being provided with wire-retaining means and a wire connecting said means whereby the wire will cross the said arms at an oblique angle, and a counterweight attached to the lower elongated end of one of the said arms whereby the said arms will be held in operative position substantially as specified and for the purpose set forth.

In testimony whereof I affix my signature in presence of two witnesses.

CHARLES A. DEYERLE.

Witnesses:
  C. L. HATCHER,
  C. M. DEYERLE.